(12) United States Patent
Lee et al.

(10) Patent No.: US 8,236,260 B2
(45) Date of Patent: Aug. 7, 2012

(54) FUEL PROCESSOR FOR FUEL CELL

(75) Inventors: Kang-hee Lee, Yongin-si (KR);
Doo-hwan Lee, Suwon-si (KR);
Hyun-chul Lee, Hwaseong-si (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 531 days.

(21) Appl. No.: 12/109,161

(22) Filed: Apr. 24, 2008

(65) Prior Publication Data
US 2009/0107045 A1    Apr. 30, 2009

(30) Foreign Application Priority Data
Oct. 29, 2007    (KR) .................. 10-2007-0109156

(51) Int. Cl.
*B01J 8/00*    (2006.01)
(52) U.S. Cl. ........ 422/627; 422/625; 422/629; 422/630; 422/636; 422/641; 422/649; 422/651; 422/187; 422/189; 422/188; 422/196; 422/198; 48/127.9; 48/61; 423/644; 423/648.1

(58) Field of Classification Search .................. 48/127.9, 48/61; 422/187–190, 198, 200
See application file for complete search history.

(56) References Cited

U.S. PATENT DOCUMENTS
| 8,114,173 | B2* | 2/2012 | Lee et al. ........................ 48/61 |
| 2004/0144029 | A1* | 7/2004 | Miura et al. ................. 48/127.9 |
| 2006/0117660 | A1* | 6/2006 | Woo et al. ........................ 48/61 |
| 2006/0150509 | A1 | 7/2006 | Suzuki et al. |

FOREIGN PATENT DOCUMENTS
| JP | 11-260387 | 9/1999 |
| JP | 2001-68137 | 3/2001 |
| KR | 10-2006-0033366 | 4/2006 |

* cited by examiner

*Primary Examiner* — Kaity V. Handal
(74) *Attorney, Agent, or Firm* — Stein McEwen, LLP

(57) ABSTRACT

A fuel processor that extracts, from a fuel source, hydrogen gas used for an electricity generation reaction. The fuel processor includes a reformer that generates hydrogen gas by reacting a fuel source with water, a burner that heats the reformer to an appropriate temperature for a hydrogen generation reaction, a CO remover that removes CO generated during the hydrogen generation reaction in the reformer, and a heat exchanger for cooling the CO remover.

7 Claims, 2 Drawing Sheets

FUEL PROCESSOR FOR FUEL CELL

CROSS-REFERENCE TO RELATED APPLICATION

This application claims the benefit of Korean Application No. 2007-109156, filed Oct. 29, 2007 in the Korean Intellectual Property Office, the disclosure of which is incorporated herein by reference.

BACKGROUND OF THE INVENTION

1. Field of the Invention

Aspects of the present invention relate to a fuel processor that extracts hydrogen gas used for an electrical energy generation reaction of a fuel cell from a fuel source, and more particularly, to a fuel processor having a CO remover as an element of the fuel process where the fuel processor has an improved cooling function.

2. Description of the Related Art

A fuel cell is an electricity generator that changes the chemical energy of a fuel into electrical energy through a chemical reaction, and the fuel cell can continuously generate electricity as long as the fuel is supplied. That is, when air including oxygen is supplied to a cathode, and hydrogen gas is supplied to an anode as a fuel, electricity is generated when electrons and hydrogen ions are formed at the anode, the hydrogen ions flow through an electrolyte to the cathode, the electrons flow separately from the anode to the cathode, and water is formed at the cathode through a combination of the supplied oxygen, the electrons and the hydrogen ions, in essence at the cathode, the reverse of electrolysis of water. However, generally, the electricity generated by a unit cell does not have a high enough voltage in order for the electricity to be used. Therefore, electricity is generated by a stack in which a plurality of unit cells is connected in series.

As a fuel source for supplying hydrogen gas to the anode of the stack, a hydrocarbon group material, such as natural gas, is used. The hydrogen gas is extracted from the fuel source in a fuel processor, and supplied to the stack. That is, the hydrogen gas is extracted from the hydrocarbon group material by reacting the hydrocarbon group material with water in the fuel processor and the hydrogen gas is supplied to the anode of the stack to use in an electricity generation reaction. In this hydrogen extraction process, CO is generated as a by-product and exists as a contaminant in the hydrogen gas. If hydrogen gas having a CO concentration of 10 ppm or more is supplied to the stack, the electrodes are poisoned, and thus, the performance of the fuel cell is rapidly reduced. Thus, a fuel processor includes a CO remover that burns CO, so that the CO concentration in the hydrogen gas is maintained below 10 ppm.

However, the reaction for removing CO is an exothermic reaction. Thus, heat generated from the reaction must be removed. If the heat is not reduced, combustion of hydrogen can occur instead of burning of the CO, and thus, there is a high possibility that the concentration of CO in the hydrogen gas exiting the fuel processor can be greater than 10 ppm. Thus, there is a need to develop a CO remover that can also be cooled efficiently.

SUMMARY OF THE INVENTION

To address the above and/or other problems, aspects of the present invention provide a fuel processor having a CO remover that can be cooled efficiently. That is, an aspect of the present invention provides a fuel processor comprising: a reformer that generates hydrogen gas by reacting a fuel source with water; a burner that heats the reformer to an appropriate temperature for a hydrogen generation reaction; a CO remover that removes CO generated during the hydrogen generation reaction in the reformer; and a heat exchanger for cooling the CO remover.

The heat exchanger may preheat the water supplied to the reformer by exchanging heat between the water with the hydrogen gas from the reformer and the exhaust gas from the burner. Correspondingly, the CO remover may be installed surrounding the outer circumference of the heat exchanger in order to be able to exchange heat with water in the heat exchanger.

The CO remover may comprise a catalyst to accelerate the CO removal reaction. The CO removal reaction may comprise a selective oxidation reaction in which CO reacts with oxygen and a methanation reaction in which CO reacts with hydrogen. The volume ratio (steam/carbon) between water entering the reformer and carbon included in the fuel source may be 2.0 to 15.0, and the volume ratio ($O_2$/CO) between oxygen in air entering the CO remover and CO in the hydrogen gas may be 0.5 to 2.0.

The fuel processor may further comprise a desulfurizer for removing sulfur components from the fuel source prior to entering the reformer and a CO shifter that is located in front of the CO remover to reduce the concentration of CO by converting the CO included in the hydrogen gas generated from the reformer into $CO_2$.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
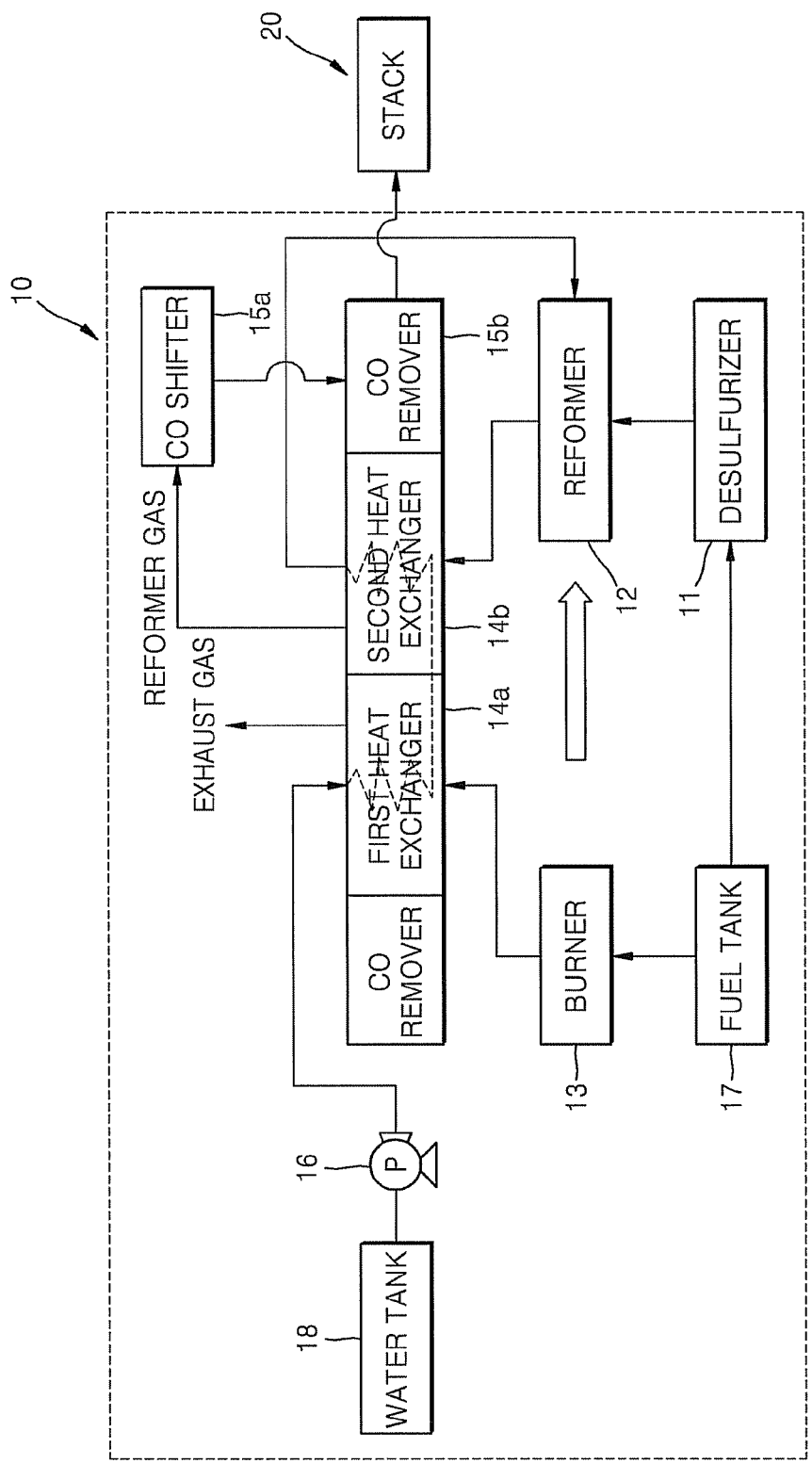
FIG. 1 is a block diagram of a configuration of a fuel processor according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a configuration of a fuel processor 10 according to an embodiment of the present invention. The fuel processor 10 basically has a configuration in which hydrogen gas is extracted from a fuel source in the fuel processor 10, and supplied to a stack 20 that generates electricity using the hydrogen gas as a fuel.

The fuel processor 10 includes a desulfurizer 11, a reformer 12, a burner 13, a water supply pump 16, first and second heat exchangers 14a and 14b, and a CO remover unit 15 (not shown or numbered separately) comprising a CO shifter 15a and a CO remover 15b. The hydrogen extraction process is performed in the reformer 12. That is, hydrogen is generated by the reformer 12 that is heated by the burner 13 through a chemical reaction 1, defined below, between a hydrocarbon group gas that acts as a fuel source entering from a fuel tank 17 and steam entering from a water tank 18 through a water supply pump 16.

$$CH_4 + 2H_2O \rightarrow CO_2 + 4H_2 \quad \text{[Chemical reaction 1]}$$

However, in a competing reaction, CO is generated as well as $CO_2$ as byproducts. As described above, if a fuel containing 10 ppm of CO or more is supplied to the stack 20, the electrodes are poisoned, thereby resulting in greatly reducing the performance of the fuel processor 10. Therefore, the concentration of CO from the outlet of the reformer 12 is controlled to 10 ppm or less by installing the CO shifter 15a and the CO remover 15b.

Chemical reaction 2, as defined below, occurs in the CO shifter 15a and chemical reactions 3 (selective oxidation reaction) and 4 (methanation reaction), as defined below, occur in the CO remover 15b. The CO concentration in the fuel that has passed through the CO shifter 15a is 5,000 ppm or less and the CO concentration in the fuel that has passed through the CO remover 15b is reduced to 10 ppm or less.

$$CO + H_2O \rightarrow CO_2 + H_2 \quad \text{[Chemical reaction 2]}$$

$$CO + \tfrac{1}{2}O_2 \rightarrow CO_2 \quad \text{[Chemical reaction 3]}$$

$$CO + 3H_2 \rightarrow CH_4 + H_2O \quad \text{[Chemical reaction 4]}$$

In the CO remover 15b, a catalyst for accelerating the selective oxidation reaction and a catalyst for accelerating the methanation reaction, respectively, can be included.

The desulfurizer 11, located at the inlet of the reformer 12, removes sulfur and sulfur compounds contained in the fuel source. The sulfur and sulfur compounds are adsorbed while passing through the desulfurizer 11 because any sulfur poisons the electrodes. That is, even if a sulfur concentration of 10 parts per billion (ppb) or more is supplied to the stack 20, electrodes can easily be poisoned.

When the fuel processor 10 is operating, a fuel source, such as a natural gas, is supplied from the fuel tank 17 to the reformer 12 through the desulfurizer 11. A portion of the fuel source is used as a fuel for igniting the burner 13. Then, steam that has entered through the first and second heat exchangers 14a and 14b and is preheated reacts with the desulfurized fuel source in the reformer 12 in order to generate hydrogen fuel. Hydrogen fuel produced in this way is supplied to the stack 20 after the CO concentration is reduced to 10 ppm or less while passing through the CO shifter 15a and the CO remover 15b.

The CO remover 15b is formed in a shape surrounding the outer circumferences of the first and second heat exchangers 14a and 14b and configured to reduce the temperature through exchange of heat with water that flows through the first and second heat exchangers 14a and 14b. That is, the first heat exchanger 14a primarily preheats water entering to the reformer 12 by using exhaust gas from the burner 13, and the second heat exchanger 14b secondarily preheats the water using reformer gas, that is, high temperature hydrogen gas generated from the reformer 12. The first and second heat exchangers 14a and 14b have the additional function of reducing the temperature of the CO remover 15b through exchange of heat between the CO remover 15b and the preheated water. Of course, the water is preheated while passing through the first and second heat exchangers 14a and 14b; however, the temperature of the preheated water is much lower than the temperature of the CO remover 15b which is hot because of the heat of the CO removal reaction, and thus, the preheated water can still perform a cooling function. That is, the temperature of the CO remover 15b increases to 300° C. because of the heat of the reaction while the temperature of the water that passes the first and second heat exchangers 14a and 14b is less than 100° C. Thus, the water can still perform a cooling function. In this way, the temperature of the CO remover 15b can be reduced to a range from 100 to 200° C., and thus, the CO remover 15b's function of removing CO to 10 ppm or less can be well maintained.

Figure 2:
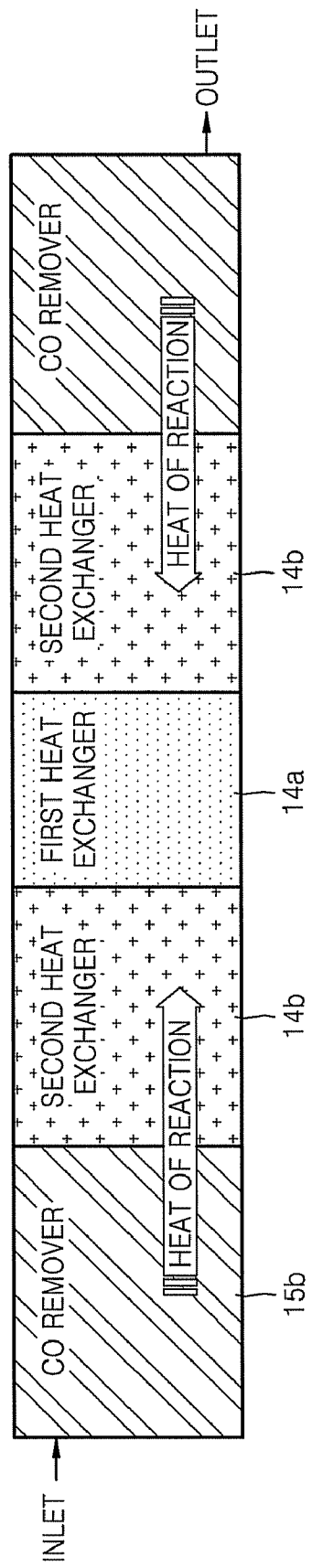
FIG. 2 is a schematic drawing of a structure of a CO remover and heat exchangers of the fuel processor of FIG. 1.

FIG. 2 is a schematic drawing of a structure of the CO remover 15b and the first and second heat exchangers 14a and 14b of the fuel processor 10 of FIG. 1. The first and second heat exchangers 14a and 14b are not separate but one body in which the first heat exchanger 14a is disposed on an inner side of the second heat exchanger 14b, and a heat exchange path is formed in which heat exchange between the exhaust gas from the burner 13 and water occurs in the first heat exchanger 14a, and a heat exchange path is formed in which heat exchange between reformer gas from the reformer 12 and the water occurs in the second heat exchanger 14b. The CO remover 15b has, for example, a donut shape and is installed to correspondingly surround the outer circumferences of the first and second heat exchangers 14a and 14b. In this way, the water is preheated to an appropriate temperature of less than 100° C. in the first and second heat exchangers 14a and 14b through heat exchange between the exhaust and reformer gases and the water, and heat exchange between the preheated water and the temperature of the CO removal reaction occurs through the contact surface between the first and second heat exchangers 14a and 14b and the CO remover 15b.

The fuel processor 10 having the above configuration can be operated as follows. A hydrocarbon group gas entering from the fuel tank 17 through the desulfurizer 11 and steam entering from the water tank 18 react in the reformer 12 through the chemical reaction 1 as defined above, and thus, hydrogen gas is generated. At this point, the water entering the reformer 12 from the water tank 18 is preheated while passing through the first and second heat exchangers 14a and 14b.

The reformer gas, that is, the hydrogen gas generated from the reformer 12 is supplied to the stack 20 after reducing the content of CO in the hydrogen gas below 10 ppm or less while passing through the CO shifter 15a and the CO remover 15b. At this point, the CO remover 15b is maintained at an appropriate temperature of 100° C. to 200° C. by being cooled through heat exchange with the first and second heat exchangers 14a and 14b, and thus, can at a steady state maintain the function of removing CO. Therefore, since the fuel processor 10 has a configuration in which the CO remover 15b is cooled using the first and second heat exchangers 14a and 14b for preheating water, without the need for an installation of an additional cooler, the fuel processor 10 can effectively reduce the temperature of the CO remover 15b with a simple configuration and can maintain the function of removing CO.

Meanwhile, the volume ratio (steam/carbon) between water entering the reformer 12 and the carbon included in methane gas may be 2.0 to 15.0, and the volume ratio ($O_2$/CO) between oxygen in air entering the CO remover 15b and the CO in the reformer gas may be 0.5 to 2.0. If the volume of steam is excessive, the temperature of the reformer gas of the reformer 12 is reduced, and if the volume of oxygen is insufficient, the temperature of the CO remover 15b is reduced. Therefore, in order to appropriately perform the functions of extracting hydrogen gas and the removing of CO and prevent overheating of the CO remover 15b, the above ranges of volume ratios are appropriate.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A fuel processor comprising:
   a reformer that generates hydrogen gas by reacting a fuel source with water;
   a burner that heats the reformer to an appropriate temperature for a hydrogen generation reaction;
   a CO remover that removes CO generated during the hydrogen generation reaction in the reformer;
   a first heat exchanger to preheat the water supplied to the reformer by exchanging heat between the water and exhaust gas from the burner; and
   a second heat exchanger to preheat the water from the first heat exchanger by exchanging heat between the water from the first heat exchanger and the hydrogen gas from the reformer and to cool the CO remover,
   wherein an inner circumference of the second heat exchanger surrounds an outer circumference of the first heat exchanger, and the CO remover surrounds an outer circumference of the second heat exchanger.

2. The fuel processor of claim 1, wherein the CO remover comprises a catalyst to accelerate a CO removal reaction.

3. The fuel processor of claim 2, wherein the CO removal reaction comprises a selective oxidation reaction in which CO reacts with oxygen and a methanation reaction in which CO reacts with hydrogen.

4. The fuel processor of claim 1, wherein the volume ratio (steam/carbon) between water entering the reformer and carbon included in the fuel source is 2.0 to 15.0.

5. The fuel processor of claim 1, further comprising a desulfurizer for removing sulfur components from the fuel source prior to the fuel entering the reformer.

6. The fuel processor of claim 1, wherein and the volume ratio ($O_2$/CO) between oxygen in air entering the CO remover and CO in the hydrogen gas is 0.5 to 2.0.

7. The fuel processor of claim 1, further comprising a CO shifter that is located in front of the CO remover to reduce CO by converting the CO included in the hydrogen gas generated from the reformer into $CO_2$.

* * * * *